(12) United States Patent
Kim et al.

(10) Patent No.: US 12,540,763 B2
(45) Date of Patent: Feb. 3, 2026

(54) VAPOR INJECTION MODULE AND HEAT PUMP SYSTEM USING SAME

(71) Applicant: Hanon Systems, Daejeon (KR)

(72) Inventors: Yun Jin Kim, Daejeon (KR); Seong Hun Kim, Daejeon (KR); Sung Je Lee, Daejeon (KR); Hae Jun Lee, Daejeon (KR)

(73) Assignee: HANON SYSTEMS (KR)

( * ) Notice: Subject to any disclaimer, the term of this patent is extended or adjusted under 35 U.S.C. 154(b) by 183 days.

(21) Appl. No.: 17/925,743

(22) PCT Filed: Jun. 29, 2021

(86) PCT No.: PCT/KR2021/008164
§ 371 (c)(1),
(2) Date: Nov. 16, 2022

(87) PCT Pub. No.: WO2022/014900
PCT Pub. Date: Jan. 20, 2022

(65) Prior Publication Data
US 2023/0194136 A1    Jun. 22, 2023

(30) Foreign Application Priority Data

Jul. 16, 2020 (KR) .......................... 10-2020-0088259

(51) Int. Cl.
*F25B 43/00* (2006.01)
*F25B 41/385* (2021.01)

(52) U.S. Cl.
CPC .......... *F25B 43/006* (2013.01); *F25B 41/385* (2021.01); *F25B 2400/23* (2013.01); *F25B 2600/2513* (2013.01)

(58) Field of Classification Search
CPC ...... F25B 41/385; F25B 41/39; F25B 43/006; F25B 43/043; F25B 2400/23; F25B 2600/2513
See application file for complete search history.

(56) References Cited

U.S. PATENT DOCUMENTS 4,881,718 A * 11/1989 Champagne .......... F16K 5/0605
                                                                251/316
6,220,566 B1 * 4/2001 Miller ..................... F25B 41/20
                                                                62/160
(Continued)

FOREIGN PATENT DOCUMENTS

CN          104515323        4/2015
DE          602008006472     6/2011
(Continued)

OTHER PUBLICATIONS

Official Action issued Aug. 23, 2025 in related Chinese Patent Application No. 202180061296.6, 10 pgs.

*Primary Examiner* — Tavia Sullens
(74) *Attorney, Agent, or Firm* — NORTON ROSE FULBRIGHT US LLP

(57) ABSTRACT

The present invention provides a vapor injection module having a first expansion device that either stops or expands the flow of condensed refrigerant and sends it to a gas-liquid separator. The gas-liquid separator then separates the refrigerant into gas and liquid parts. A second expansion device allows the condensed refrigerant to pass through, expand it, or expand the liquid refrigerant from the separator.

11 Claims, 11 Drawing Sheets

(56) References Cited

U.S. PATENT DOCUMENTS

2011/0120578 A1    5/2011  Lockhart
2018/0209548 A1    7/2018  Zens et al.

FOREIGN PATENT DOCUMENTS

| EP | 1961597 | 8/2008 | |
|----|---------|--------|---|
| JP | 2013092355 A | 5/2013 | |
| JP | 2015137779 A | 7/2015 | |
| JP | 6295676 B2 * | 3/2018 | ................ F25B 5/04 |
| JP | 2019-109031 A | 7/2019 | |
| KR | 2016-0066180 A | 6/2016 | |
| KR | 20190026247 | 3/2019 | |
| KR | 20190032072 A * | 3/2019 | |
| KR | 20190051742 A | 5/2019 | |
| KR | 2020-0051538 A | 5/2020 | |
| WO | WO 2015111116 | 7/2015 | |
| WO | WO 2019085956 | 5/2019 | |

\* cited by examiner

VAPOR INJECTION MODULE AND HEAT PUMP SYSTEM USING SAME

CROSS REFERENCE TO RELATED APPLICATIONS

This application is a national phase under 35 U.S.C. § 371 of International Application No. PCT/KR2021/008164 filed on Jun. 29, 2021, which claims the benefit of priority from Korean Patent Application No. 10-2020-0088259 filed on Jul. 16, 2020. The entire contents of these applications are incorporated herein by reference in their entirety.

TECHNICAL FIELD

Embodiments disclosed herein relate to a vapor injection module and a heat pump system using the same. The embodiments relate to a vapor injection module capable of expanding a refrigerant, performing a bypass operation, and separating a gas and a liquid depending on an air conditioning mode, and a heat pump system using the same.

BACKGROUND ART

As development and research have been conducted on environmental-friendly technologies and alternative energy sources for replacing fossil raw materials, and electric vehicles and hybrid vehicles have been considered as most attractive fields in recent vehicle industries. Batteries are mounted in the electric vehicles and hybrid vehicles to provide driving power. The power of the battery is used not only to drive the vehicle, but also to cool or heat a vehicle interior.

When the battery is used as a heat source for cooling or heating the interior of the vehicle that provides driving power by using the battery, the traveling distance decreases to that extent. To solve this problem, a method of applying a heat pump system, which has been widely used as a domestic cooling or heating device in the related art, to the vehicle has been proposed.

For reference, the heat pump refers to a process of absorbing low-temperature heat and transferring the absorbed heat to a high-temperature location. For example, the heat pump implements a cycle in which a liquid refrigerant becomes a gaseous refrigerant by evaporating in an evaporator and absorbing heat from the surrounding, and the gaseous refrigerant becomes the liquid refrigerant by dissipating heat to the surrounding by means of a condenser. The application of the heat pump to the electric or hybrid vehicle may advantageously ensure an insufficient heat source in a general air conditioning casing in the related art.

When an outside air temperature is too low during a process of heating a vehicle interior by using the heat pump system, the heating ability significantly deteriorates. This is caused by an insufficient heat absorbing source. When the amount of gaseous refrigerant to be transmitted to a compressor is insufficient, the heating efficiency deteriorates.

Various studies have been performed by vehicle manufacturers in many countries to solve the above-mentioned problems. For example, a method of improving heating performance by using a PTC heater and a method of improving heating performance by using waste heat of electrical components have been used in some instances.

However, even the methods in the related art are not effective in solving a problem of deterioration in heating performance during a heat pump defrosting operation. Further, a method, which unilaterally consumes a battery, is mainly used to improve heating performance, but this method causes a problem of significant deterioration in drivability of the battery.

DISCLOSURE

Technical Problem

An object of an embodiment is to provide a vapor injection module capable of improving heating efficiency even in a cryogenic state with a low outside air temperature.

Another object of the embodiment is to provide a vapor injection module, in which a refrigerant bypasses a gas-liquid separator (LGS) in an interior cooling and non-vapor injection mode, thereby implementing excellent heating efficiency without an unnecessary pressure drop.

Technical problems to be solved by the present invention are not limited to the above-mentioned technical problems, and other technical problems, which are not mentioned above, may be clearly understood by those skilled in the art from the following descriptions.

Technical Solution

An embodiment of the present invention provides a vapor injection module including: a first expansion means configured to block a flow of a condensed refrigerant or expand the condensed refrigerant and transmit the refrigerant to a gas-liquid separator in accordance with an air conditioning mode; the gas-liquid separator configured to receive the refrigerant from the first expansion means and separate the refrigerant into a gaseous refrigerant and a liquid refrigerant; and a second expansion means configured to allow the condensed refrigerant to pass therethrough, expand the condensed refrigerant, or expand the liquid refrigerant separated in the gas-liquid separator in accordance with the air conditioning mode.

In particular, when the first expansion means blocks a flow of the condensed refrigerant, the second expansion means may allow the condensed refrigerant to pass therethrough or expand the condensed refrigerant.

In particular, in a cooling mode among the air conditioning modes, the first expansion means may block a flow of the condensed refrigerant, and the second expansion means may allow the condensed refrigerant to pass therethrough.

In particular, in a cooling mode among the air conditioning modes, the first expansion means may block a flow of the refrigerant, and the second expansion means may allow the condensed refrigerant to pass therethrough.

In particular, in a vapor injection heating mode among the air conditioning modes, the first expansion means may expand the condensed refrigerant, the gas-liquid separator may separate the expanded refrigerant into the gaseous refrigerant and the liquid refrigerant, transmit the gaseous refrigerant to the compressor, and transmit the liquid refrigerant to the second expansion means, and the second expansion means may expand the liquid refrigerant.

In particular, the gas-liquid separator may separate the refrigerant into the gaseous refrigerant and the liquid refrigerant only in a vapor injection heating mode among the air conditioning modes including a cooling mode, a general heating mode, and the vapor injection heating mode.

In particular, the vapor injection module may further include: a first line connected to an inlet port into which the refrigerant is introduced; a second line connected to the first line and one region of an upper side of the gas-liquid separator; a third line connected to the first line and one region of a lower side of the gas-liquid separator; the first expansion means disposed in the second line and configured to control a movement direction of and whether to expand the refrigerant in accordance with the air conditioning mode; and the second expansion means disposed in the third line and configured to control a movement direction of and whether to expand the liquid refrigerant introduced through the first line or separated in the gas-liquid separator and introduced.

In particular, the first expansion means may include a first ball valve disposed in the second line and configured to rotate.

In particular, the first ball valve may include a first inflow hole, and a first expansion groove connected to the first inflow hole.

In particular, the gas-liquid separator may include: a housing having an internal space in which the refrigerant flows; an outflow passage disposed at an upper side of the housing and configured to discharge the gaseous refrigerant, the outflow passage being provided in the form of a pipe to prevent the introduction of the liquid refrigerant; and a movement passage disposed at a lower side of the housing and configured to discharge the liquid refrigerant to the second expansion means.

In particular, the second line connected to the housing may be disposed so that the refrigerant is discharged toward a sidewall of the housing.

In particular, a partition wall part may be disposed at one side of the movement passage and configured to prevent the refrigerant from scattering.

In particular, the partition wall part may be larger than a diameter of the outflow passage to prevent the scattering liquid refrigerant from moving to the outflow passage.

In particular, the second expansion means may include a second ball valve having a second inflow hole, a second outflow hole connected to the second inflow hole, and a second expansion groove formed at one side of the second outflow hole.

In particular, in a cooling mode, the refrigerant may flow along the first line and the third line, a flow of the refrigerant in the second line may be blocked by the first expansion means, and the second expansion means may perform a bypass operation on the refrigerant.

In particular, in a vapor injection heating mode, the refrigerant may flow along the first line, the refrigerant may be expanded by the first expansion means and flows to the gas-liquid separator, and the liquid refrigerant separated in the gas-liquid separator may be expanded by the second expansion means and discharged.

In particular, in a heating mode, the refrigerant may flow along the first line and the second line, and the refrigerant may be expanded by the second expansion means and discharged.

Another embodiment of the present invention provides a vapor injection heat pump system including: a compressor configured to compress and discharge a refrigerant; a condenser configured to condense the compressed refrigerant; a first expansion means configured to block a flow of the condensed refrigerant or expand the condensed refrigerant and transmit the refrigerant to a gas-liquid separator in accordance with an air conditioning mode; the gas-liquid separator configured to receive the refrigerant from the first expansion means and separate the refrigerant into a gaseous refrigerant and a liquid refrigerant; a second expansion means configured to allow the condensed refrigerant to pass therethrough, expand the condensed refrigerant, or expand the liquid refrigerant separated in the gas-liquid separator in accordance with the air conditioning mode; an external heat exchanger configured to condense or evaporate the refrigerant transmitted from the second expansion means; a third expansion means configured to control a movement direction of and whether to expand the refrigerant transmitted from the external heat exchanger in accordance with the air conditioning mode; and an evaporator configured to cool an interior by using the refrigerant transmitted from the third expansion means.

In particular, the second expansion means may be disposed in parallel with the first expansion means.

In particular, when the air conditioning mode is a cooling mode, the first expansion means may block a flow of the refrigerant, and the second expansion means may perform a bypass operation on the refrigerant and transmit the refrigerant to the external heat exchanger.

In particular, when the air conditioning mode is a vapor injection heating mode, the first expansion means may expand the condensed refrigerant and transmits the refrigerant to the gas-liquid separator, the gaseous refrigerant separated in the gas-liquid separator may be introduced into the compressor, and the liquid refrigerant separated in the gas-liquid separator may be expanded by the second expansion means and transmitted to the external heat exchanger.

In particular, when the air conditioning mode is a general (non-vapor injection) heating mode, the first expansion means may block a flow of the refrigerant, and the second expansion means may expand the refrigerant and transmit the refrigerant to the external heat exchanger.

In particular, the vapor injection heat pump system may further include: a fourth expansion means connected to the third expansion means in parallel; and a chiller connected to the fourth expansion means and configured to allow the refrigerant and a coolant to exchange heat with each other.

In particular, the vapor injection heat pump system may further include an internal heat exchanger configured to heat the interior by using the refrigerant compressed by the compressor.

In particular, the evaporator and the internal heat exchanger may be disposed in an air conditioning casing.

In particular, the refrigerant in the internal heat exchanger may exchange heat with air, and the air, which has exchanged heat with refrigerant, may be introduced into the interior and heat the interior.

In particular, the refrigerant in the internal heat exchanger may exchange heat with a coolant, and the coolant, which has exchanged heat with the refrigerant, may exchange heat with the air for heating the interior.

In particular, the vapor injection heat pump system may further include: a water-cooled condenser configured to allow the coolant and the refrigerant discharged from the internal heat exchanger to exchange heat with each other.

Advantageous Effects

According to the embodiment, it is possible to improve the heating efficiency even in a cryogenic state with a low outside air temperature.

In particular, the refrigerant bypasses the gas-liquid separator in the interior cooling and non-vapor injection mode, which makes it possible to improve heating efficiency without an unnecessary pressure drop.

The various, beneficial advantages and effects of the present invention are not limited to the above-mentioned contents and may be more easily understood during the process of describing the specific embodiments of the present invention.

MODE FOR INVENTION

Figure 1:
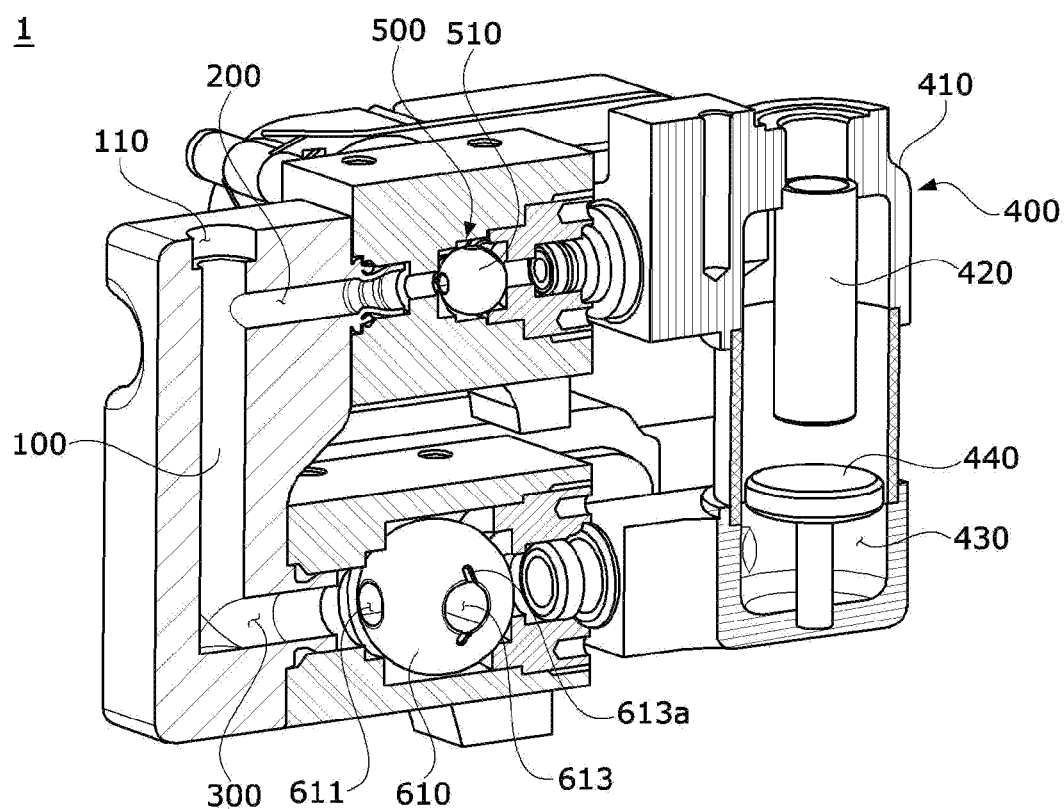
FIG. 1 is a view illustrating an interior of a vapor injection module according to an embodiment of the present invention.

Hereinafter, exemplary embodiments of the present invention will be described in detail with reference to the accompanying drawings.

However, the technical spirit of the present invention is not limited to some embodiments described herein but may be implemented in various different forms. One or more of the constituent elements in the embodiments may be selectively combined and substituted within the scope of the technical spirit of the present invention.

In addition, unless otherwise specifically and explicitly defined and stated, the terms (including technical and scientific terms) used in the embodiments of the present invention may be construed as the meaning which may be commonly understood by the person with ordinary skill in the art to which the present invention pertains. The meanings of the commonly used terms such as the terms defined in dictionaries may be interpreted in consideration of the contextual meanings of the related technology.

In addition, the terms used in the embodiments of the present invention are for explaining the embodiments, not for limiting the present invention.

In the present specification, unless particularly stated otherwise, a singular form may also include a plural form. The expression "at least one (or one or more) of A, B, and C" may include one or more of all combinations that can be made by combining A, B, and C.

In addition, the terms first, second, A, B, (a), and (b) may be used to describe constituent elements of the embodiments of the present invention.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "above (on) or below (under)" may include a meaning of a downward direction as well as an upward direction based on one constituent element.

Hereinafter, embodiments will be described in detail with reference to the accompanying drawings. The same or corresponding constituent elements are assigned with the same reference numerals regardless of reference numerals, and the repetitive description thereof will be omitted.

FIGS. 1 to 13 clearly illustrate only main features for conceptually and clearly understanding the present invention. As a result, various modifications of the drawings are expected, and the scope of the present invention need not be limited to particular shapes illustrated in the drawings.

Figure 2:
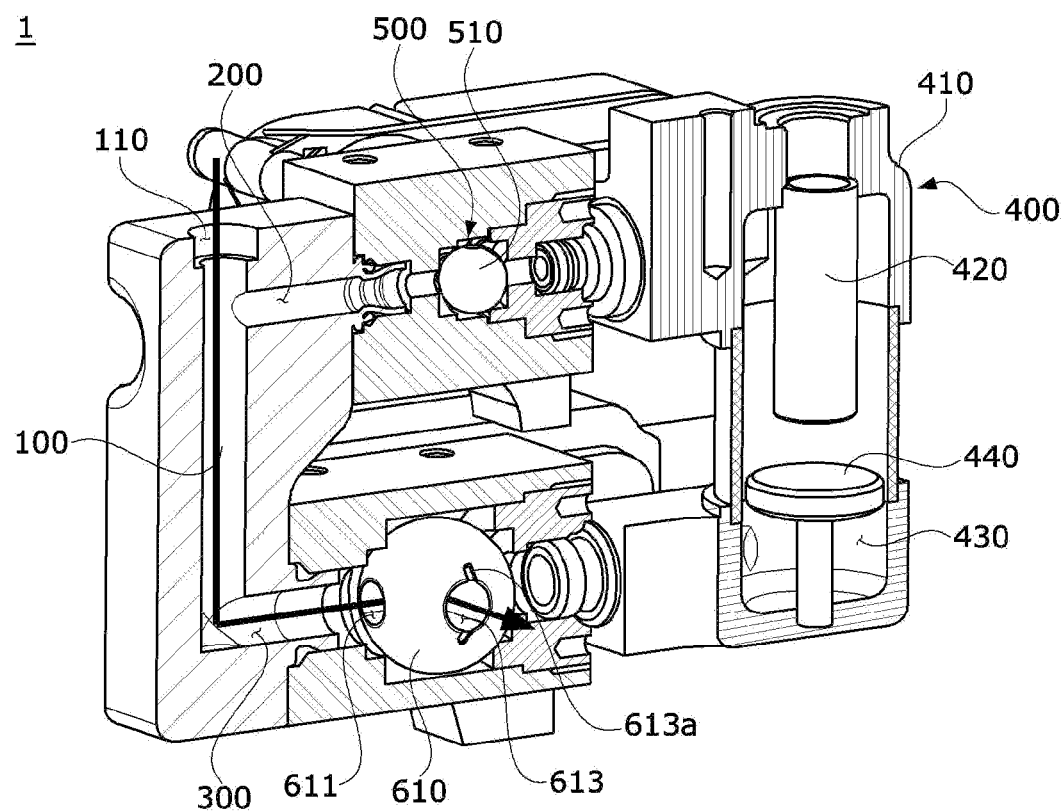
FIG. 2 is a view illustrating an operation of a refrigerant in a cooling mode in FIG. 1.
Figure 3:
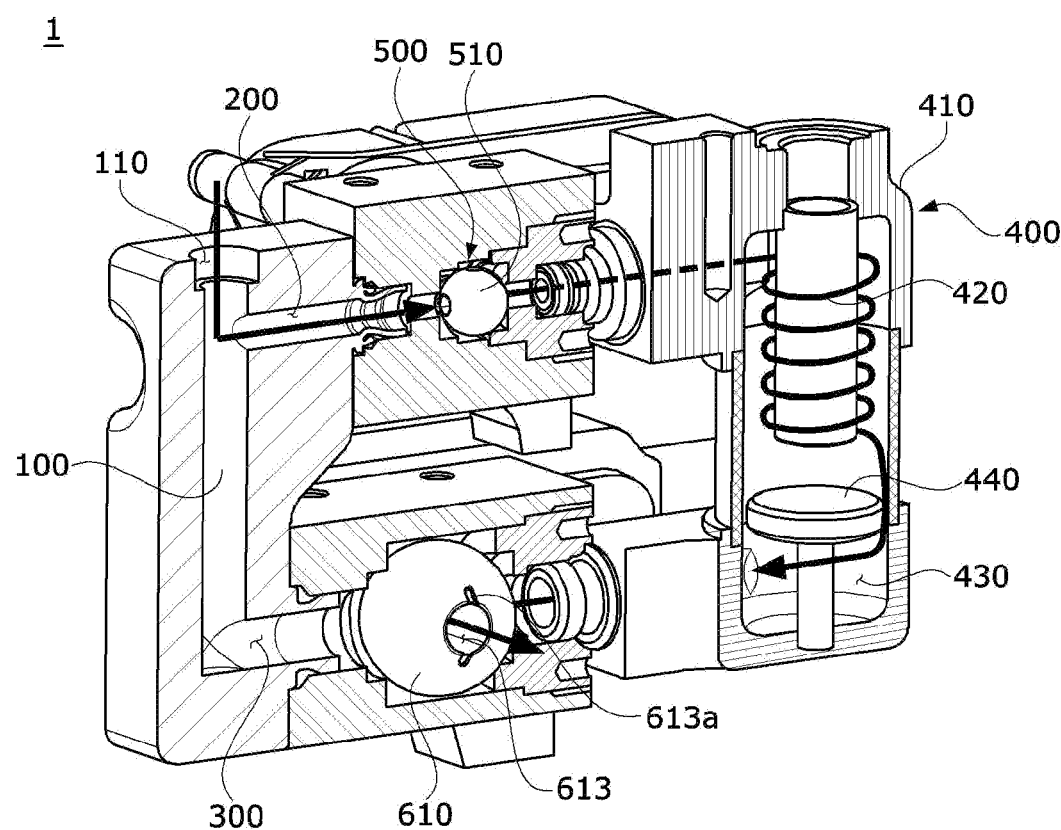
FIG. 3 is a view illustrating an operation of the refrigerant in a vapor injection heating mode in FIG. 1.
Figure 4:
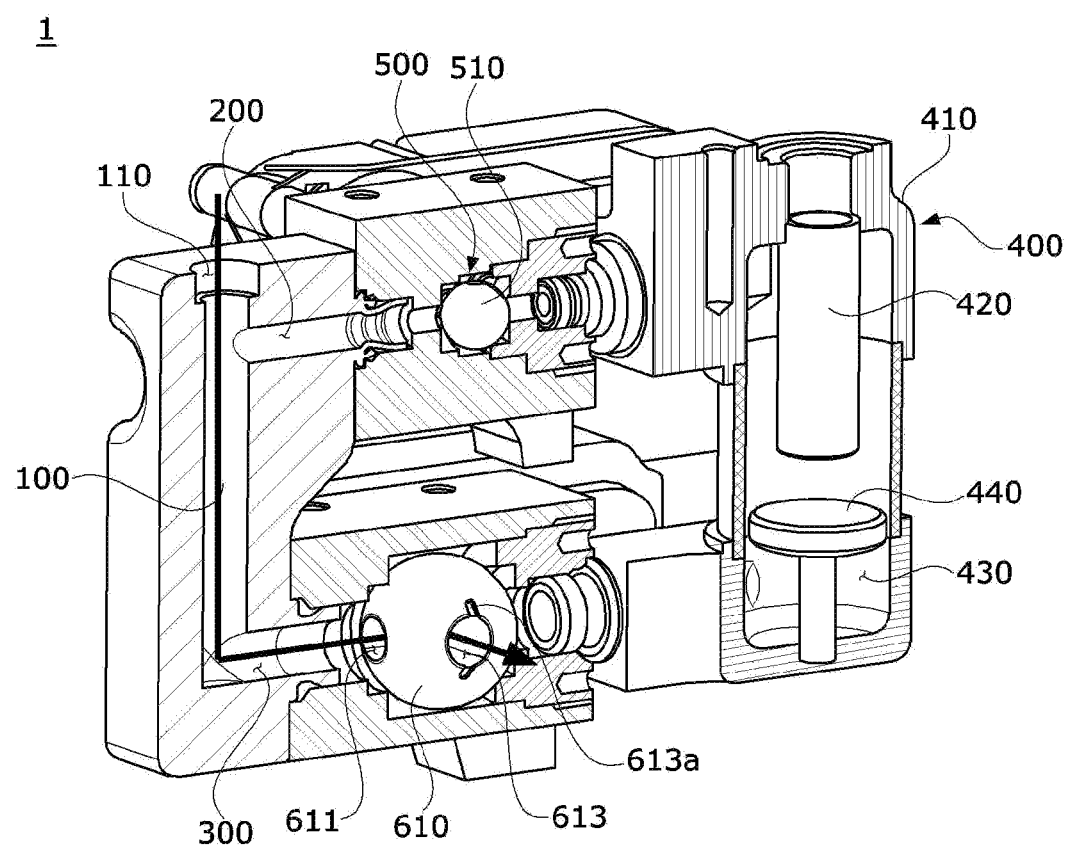
FIG. 4 is a view illustrating an operation of the refrigerant in a heating mode in FIG. 1.
Figure 5:
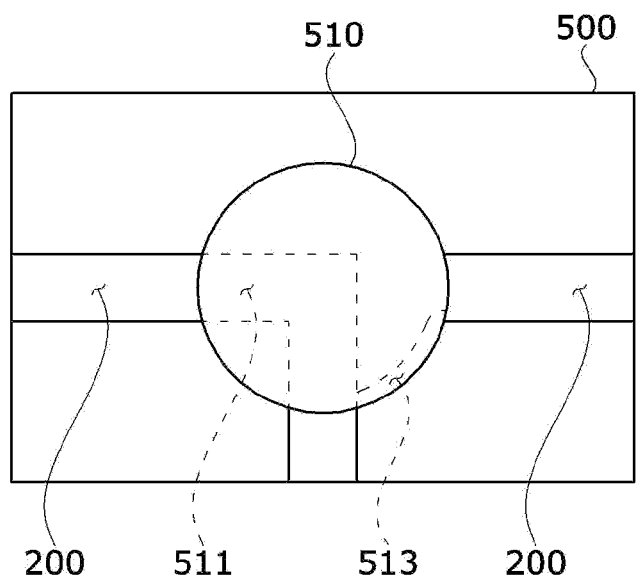
FIGS. 5 and 6 are views for explaining an operation of a first expansion means that is a constituent element in FIG. 1.
Figure 6:
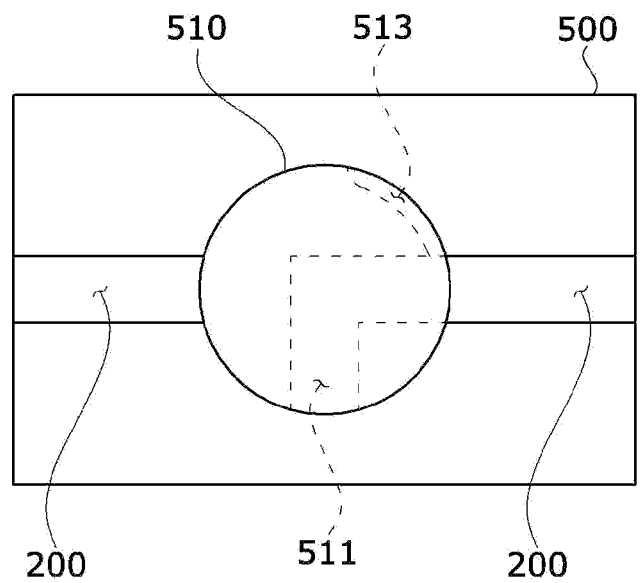

FIG. 1 is a view illustrating an interior of a vapor injection module according to an embodiment of the present invention, FIG. 2 is a view illustrating an operation of a refrigerant in a cooling mode in FIG. 1, FIG. 3 is a view illustrating an operation of the refrigerant in a vapor injection heating mode in FIG. 1, FIG. 4 is a view illustrating an operation of the refrigerant in a heating mode in FIG. 1, FIGS. 5 and 6 are views for explaining an operation of a first expansion means that is a constituent element in FIG. 1, and FIGS. 7 to 9 are views for explaining an operation of a second expansion means that is a constituent element in FIG. 1.

Referring to FIGS. 1 to 9, a vapor injection module 1 according to an embodiment of the present invention may include a first line 100, a gas-liquid separator 400, a second line 200, a third line 300, a first expansion means 500, and a second expansion means 600.

The first line 100 is connected to an inlet port 110 into which a refrigerant is introduced. The first line 100 may provide a passageway through which the refrigerant is introduced into the vapor injection module 1. In one embodiment, the first line 100 may have a circular tube structure, and various tube structures may be used to move the refrigerant.

The gas-liquid separator 400 may receive the refrigerant from the first expansion means 500 and separate the refrigerant into a gaseous refrigerant and a liquid refrigerant. The gas-liquid separator 400 may move the separated gaseous refrigerant to a compressor 10 and move the liquid refrigerant to the third line 300.

The gas-liquid separator 400 may include a housing 410, an outflow passage 420, and a movement passage 430.

The housing 410 provides an internal space in which the refrigerant flows. The housing 410 has a cylindrical structure, and an inner wall of the housing 410 may have an inclination. The inclination may decrease a radius of the housing toward a lower side of the housing, thereby providing an effect of correcting a flow velocity.

An outlet port may be disposed at an upper side of the housing 410, and the movement passage 430 may be formed at a lower side of the housing 410.

The outflow passage 420 may be connected to the outlet port, and the gaseous refrigerant may flow to the outlet port through the outflow passage 420.

The second line 200 is connected to one region of the upper side of the housing 410. The second line 200 may be disposed such that the refrigerant is discharged toward a sidewall of the housing 410, thereby defining a circulation of the refrigerant. The refrigerant discharged from the second line 200 flows downward while spirally flowing along a sidewall of the outflow passage 420.

The movement passage 430 provides a passageway through which the refrigerant liquefied in the housing 410 flows toward the second expansion means 600 disposed in the third line 300.

A partition wall part 440 may be disposed at one side of the movement passage 430 and prevent the refrigerant from scattering.

The partition wall part 440 may be positioned at a central portion of the movement passage 430, i.e., a lower side of the outflow passage 420 and prevent the refrigerant flowing through the movement passage from scattering and being introduced into the outflow passage 420. In one embodiment, the partition wall part 440 may have a structure of a circular plate and have a diameter larger than a diameter of the outflow passage 420. A shape of the partition wall part 440 is not limited, but the partition wall part 440 may be larger in cross-section than the outflow passage 420. The partition wall part 440 may be variously modified depending on a cross-sectional shape of the outflow passage 420.

In addition, a fixing part may be connected to the partition wall part 440, such that the partition wall part 440 may be fixed to the housing 410. In one embodiment, the fixing part may have a rod structure. The fixing part may be fixed by a structure having one side connected to the partition wall part 440, and the other side fixed to the housing 410.

The second line 200 may have one side connected to the first line 100, and the other side connected to one region at an upper side of the gas-liquid separator 400. The second line 200 provides a passageway through which the refrigerant flows. The first expansion means 500 may be disposed in one region of the second line 200.

The first expansion means 500 may block a flow of the condensed refrigerant or expand the condensed refrigerant and transmit the expanded refrigerant to the gas-liquid separator 400 in accordance with the air conditioning mode.

The first expansion means 500 may include a first ball valve 510 disposed at a center of the second line 200 and configured to rotate. The first ball valve 510 may include a first inflow hole 511 and a first expansion groove 513 connected to the first inflow hole 511.

The refrigerant introduced into the first expansion means 500 may flow through the first inflow hole 511 formed in the first ball valve 510, expand while passing through the first expansion groove 513, and then enter the gas-liquid separator 400.

A driver may be connected to the first ball valve 510, such that the first ball valve 510 may rotate. The flow of the refrigerant to the second line 200 may be allowed or blocked in accordance with the rotation of the first ball valve 510.

Further, the first expansion means 500 and the second expansion means 600 are each an electronic expansion valve. Although reference numerals are omitted, the first expansion means 500 and the second expansion means 600 may each have an actuator (motor) for rotating the ball valve and control the amount of expansion of the refrigerant or a flow rate of the refrigerant in accordance with a rotation angle of the actuator.

Referring to FIGS. 5 and 6, the first inflow hole 511 may have a bent structure, and the first expansion groove 513 may be connected to an end of the first inflow hole 511.

In case that the first inflow hole 511 is disposed in the second line 200 as illustrated in FIG. 5, the refrigerant enters the first ball valve 510, expands while passing through the first expansion groove 513, and then flows to the gas-liquid separator 400.

Referring to FIG. 6, when the ball valve rotates and the second line 200 and the first inflow hole 511 are not aligned with each other, the flow of the refrigerant to the second line 200 may be blocked.

FIGS. 5 and 6 illustrate one embodiment of the first expansion means 500 that uses the ball valve. However, various publicly-known structures capable of expanding the refrigerant while controlling the flow of the refrigerant may be used.

The third line 300 may be connected to the first line 100 and one region of a lower side of the gas-liquid separator 400 and provide a passageway through which the refrigerant may flow.

The third line 300 may have one side connected to the first line 100, and the other side connected to the movement passage 430 of the gas-liquid separator 400, such that the refrigerant may flow.

The second expansion means 600 may allow the condensed refrigerant to pass therethrough, expand the condensed refrigerant, or expand the liquid refrigerant separated in the gas-liquid separator 400 in accordance with the air conditioning mode.

The second expansion means 600 may be disposed in the third line 300 and control the movement direction of and whether to expand the liquid refrigerant introduced through the first line 100 or separated in the gas-liquid separator 400.

In case that the first expansion means 500 block the flow of the condensed refrigerant, the second expansion means 600 may allow the condensed refrigerant to pass therethrough or expand the condensed refrigerant.

The second expansion means 600 may include a second ball valve 610 having a second inflow hole 611, a second outflow hole 613 connected to the second inflow hole 611, and a second expansion groove 613a formed at one side of the second outflow hole 613.

The second ball valve 610 has a spherical shape. The second ball valve 610 may be connected to a driver (not illustrated) and rotated. The second ball valve 610 may be disposed in the second expansion means 600.

The second inflow hole 611 and the second outflow hole 613 of the second ball valve 610 may be connected and define a passageway through which the refrigerant flows. In one embodiment, the second inflow hole 611 and the second outflow hole 613 may be connected to define an angle of 90 degrees. However, the angle between the second inflow hole 611 and the second outflow hole 613 is not limited thereto. The angle may be modified be various angles.

The second expansion groove 613a may be connected to an end of the second outflow hole 613 and expand and move the refrigerant flowing through the second outflow hole 613. In one embodiment, the second expansion groove 613a may have an elongated shape and expand the refrigerant by using a change in pressure of the flowing refrigerant.

The second ball valve 610 operates to move or expand the refrigerant. The second ball valve 610 may change positions of the second inflow hole 611, the second outflow hole 613, and the second expansion groove 613a by rotating to move or expand the refrigerant.

Figure 7:
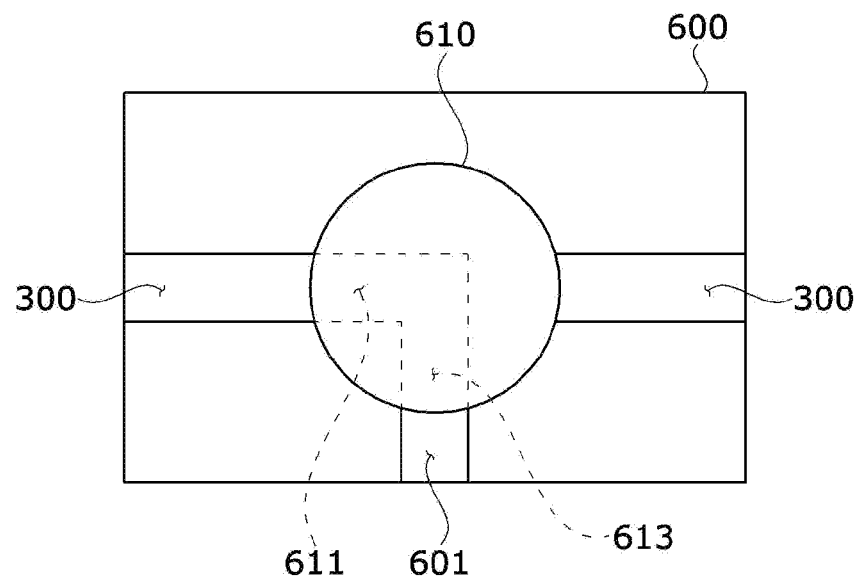
FIGS. 7 to 9 are views for explaining an operation of a second expansion means that is a constituent element in FIG. 1.

Referring to FIG. 7, the second outflow hole 613 may be disposed at a side adjacent to the third line 300 connected to the first line 100. A second outlet port, which is connected to the second outflow hole 613 at an angle of 90 degrees, may be disposed at a side adjacent to a refrigerant outlet 601 formed in the second expansion means 600 and move the refrigerant. In this case, when a side of the third line 300 connected to the gas-liquid separator 400 is blocked, the refrigerant flows toward the refrigerant outlet 601 without passing through the second expansion groove 613a.

Figure 8:
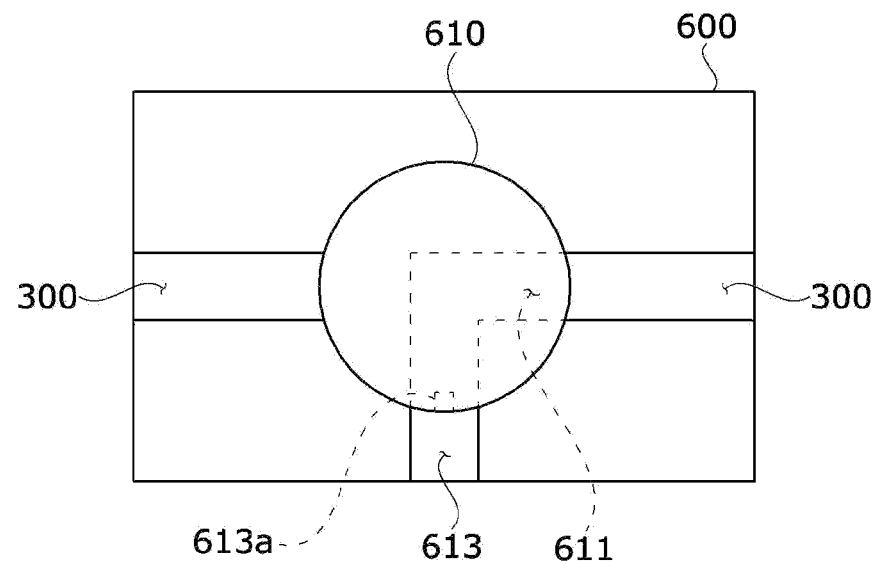

Referring to FIG. 8, the second outflow hole 613 may be disposed at a side adjacent to the third line 300 connected to the gas-liquid separator 400. The second outlet port, which is connected to the second outflow hole 613 at an angle of 90 degrees, may be disposed in the vicinity of the second expansion means 600. In this case, when the second outlet port is blocked by an inner wall of the second expansion means 600, the refrigerant is expanded by the second expansion groove 613a and flows toward the refrigerant outlet 601.

Figure 9:
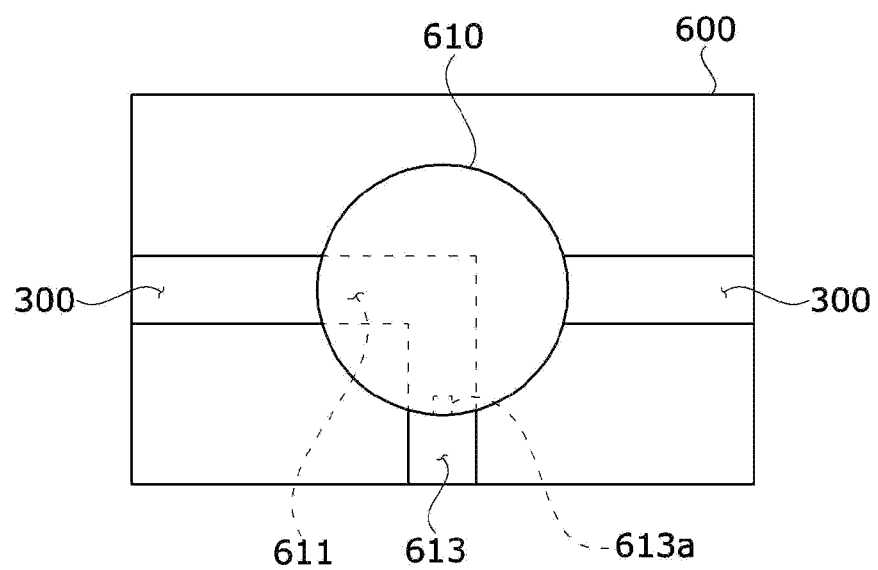

Referring to FIG. 9, the second outflow hole 613 may be disposed at the side of the third line 300 connected to the first line 100. The second outlet port, which is connected to the second outflow hole 613 at an angle of 90 degrees, may be disposed in the vicinity of the second expansion means 600. In this case, when the second outlet port is blocked by the inner wall of the second expansion means 600, the refrigerant is expanded by the second expansion groove 613a and flows toward the refrigerant outlet 601.

As described above, the second expansion means 600 may perform a bypass operation on the refrigerant introduced through the first line 100 or the gas-liquid separator 400 or expand and move the refrigerant introduced through the first line 100 or the gas-liquid separator 400.

Hereinafter, an operation of the vapor injection module 1 according to the air conditioning mode will be described.

FIG. 2 is a view illustrating an operation of the refrigerant in a cooling mode in the vapor injection module 1 according to the embodiment of the present invention.

Referring to FIG. 2, in the cooling mode, the first expansion means 500 may block the flow of the condensed refrigerant, and the second expansion means 600 may allow the condensed refrigerant to pass therethrough.

In the cooling mode, the refrigerant is introduced through the inlet port 110. In this case, the flow of the refrigerant in the second line 200 connected to the first line 100 is blocked by the first expansion means 500, and the refrigerant flows to the third line 300.

The second expansion means 600 may move the refrigerant, which is introduced through the third line 300, to the refrigerant outlet 601 while performing the bypass operation.

FIG. 3 is a view illustrating an operation of the refrigerant in a vapor injection heating mode in the vapor injection module 1 according to the embodiment of the present invention.

Referring to FIG. 3, in the vapor injection heating mode, the first expansion means 500 may expand the condensed refrigerant, the gas-liquid separator 400 may separate the expanded refrigerant into the gaseous refrigerant and the liquid refrigerant, transmit the gaseous refrigerant to the compressor, and transmit the liquid refrigerant to the second expansion means 600, and the second expansion means 600 may expand the liquid refrigerant.

In the vapor injection heating mode, the refrigerant is introduced through the inlet port 110. In this case, the refrigerant is introduced as the first expansion means 500 is opened. The introduced refrigerant is expanded to a middle pressure by the first expansion means 500 and introduced into the gas-liquid separator 400. The first expansion means 500 may expand the introduced refrigerant to a middle pressure and reduce a load applied to the compressor, thereby improving heat exchange efficiency in an evaporator.

The refrigerant introduced into the gas-liquid separator 400 may flow downward while circulating along the sidewall of the housing 410 of the gas-liquid separator 400. The liquid refrigerant separated in the gas-liquid separator 400 may flow to the third line 300 through a connection passage, and the separated gaseous refrigerant may be discharged through the outflow passage 420.

The second ball valve 610 of the second expansion means 600 may prevent the refrigerant from being introduced from the first line 100 to the third line 300 and allow the refrigerant to enter the third line 300 connected to the gas-liquid separator 400.

The refrigerant introduced into the second ball valve 610 may be expanded to a low pressure through the second expansion groove 613a and discharged through the refrigerant outlet 601.

In the vapor injection heating mode, an expansion pressure of the refrigerant may be adjusted as the refrigerant sequentially passes through the first expansion means 500 and the second expansion means 600, which makes it possible to improve the efficiency.

FIG. 4 is a view illustrating an operation of the refrigerant in a general heating mode (non-vapor injection mode) in the vapor injection module 1 according to the embodiment of the present invention.

Referring to FIG. 4, in the general heating mode, the first expansion means 500 may block the flow of the condensed refrigerant, and the second expansion means 600 may expand the condensed refrigerant.

In the general heating mode, the refrigerant is introduced through the inlet port 110. In this case, the flow of the refrigerant in the second line 200 connected to the first line 100 is blocked by the first expansion means 500, and the refrigerant flows to the third line 300.

The second ball valve 610 of the second expansion means 600 may prevent the refrigerant from being introduced from the gas-liquid separator 400 to the third line 300 and allow the refrigerant to enter the third line 300 connected to the first line 100.

The refrigerant introduced into the second ball valve 610 may be expanded to a low pressure through the second expansion groove 613a and discharged through the refrigerant outlet 601.

As described above, the vapor injection module 1 according to the embodiment of the present invention separates the refrigerant into the gaseous refrigerant and the liquid refrigerant only in the vapor injection heating mode among the air conditioning modes including the cooling mode, the general heating mode, and the vapor injection heating mode.

Meanwhile, a heat pump system using a vapor injection module 1 according to another embodiment of the present invention will be described below with reference to the accompanying drawings. A description of the configuration identical to the configuration of the vapor injection module 1 according to the above-mentioned embodiment of the present invention will be omitted.

Figure 10:
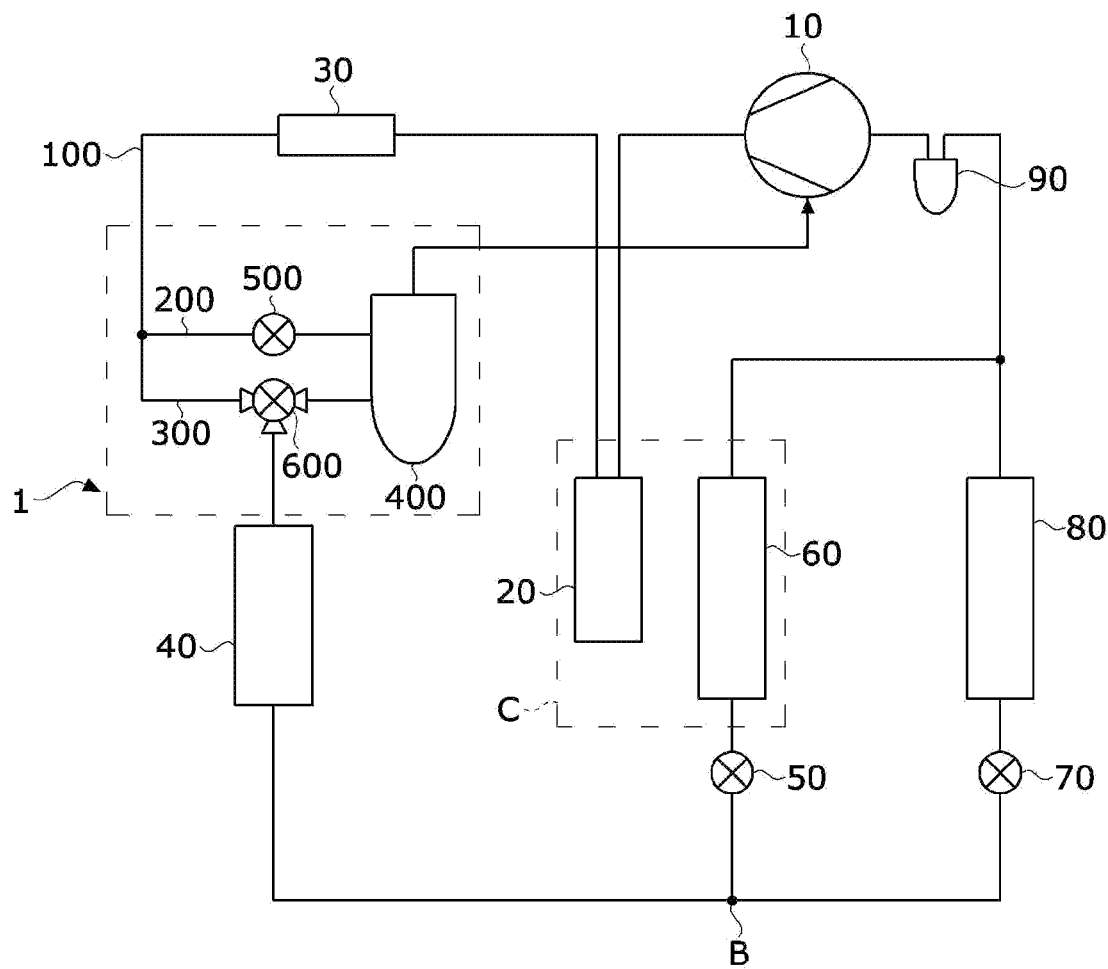
FIG. 10 is a structural view of a heat pump system using a vapor injection module according to another embodiment of the present invention.
Figure 11:
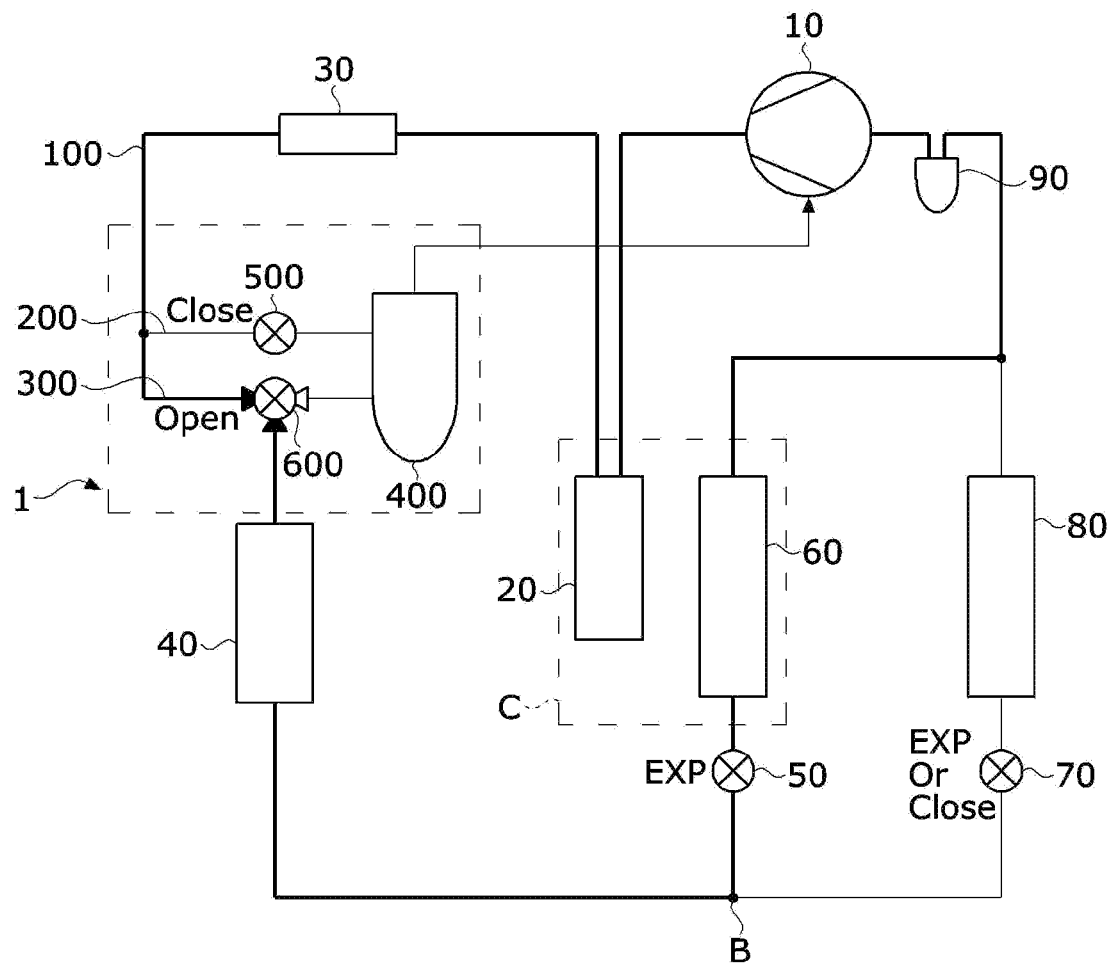
FIG. 11 is a view illustrating an operating state of the system in a cooling mode in FIG. 10.
Figure 12:
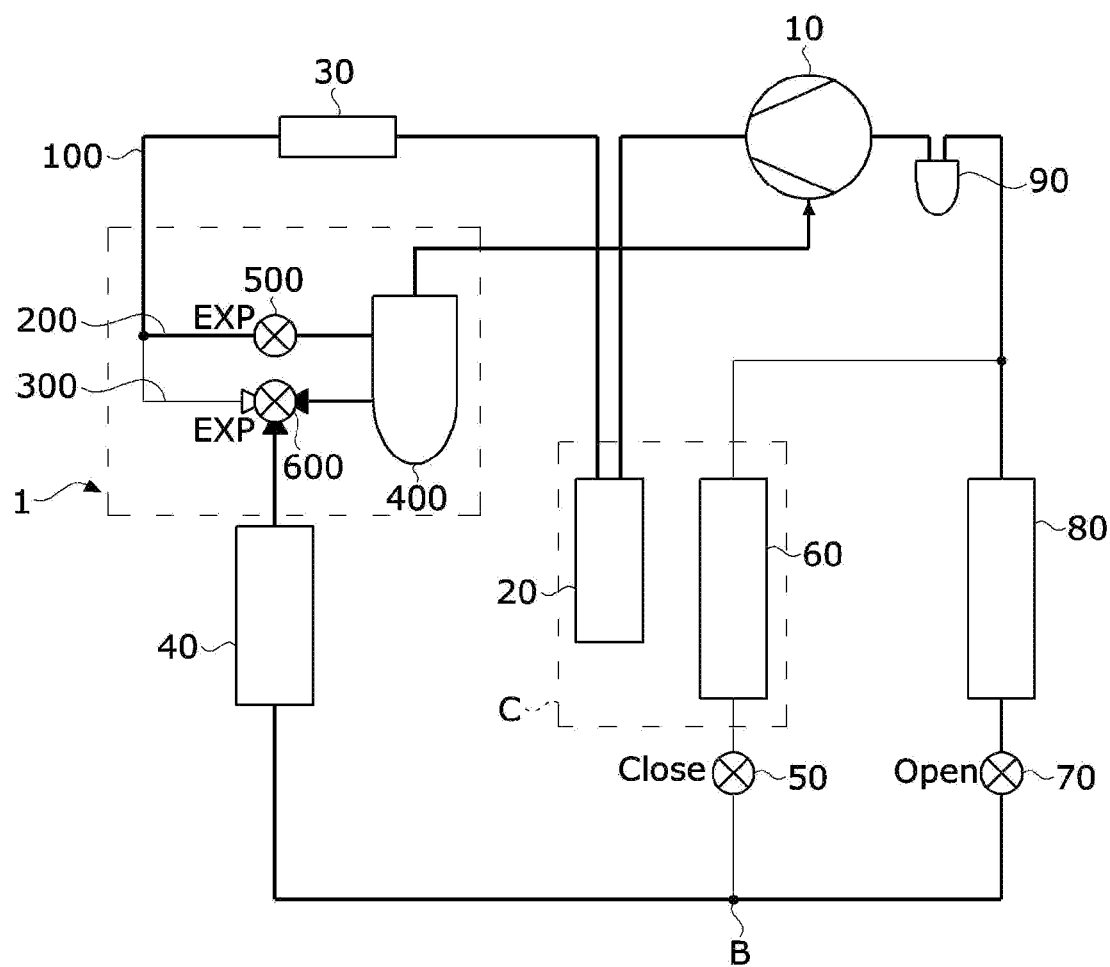
FIG. 12 is a view illustrating an operating state of the system in a vapor injection heating mode in FIG. 10.
Figure 13:
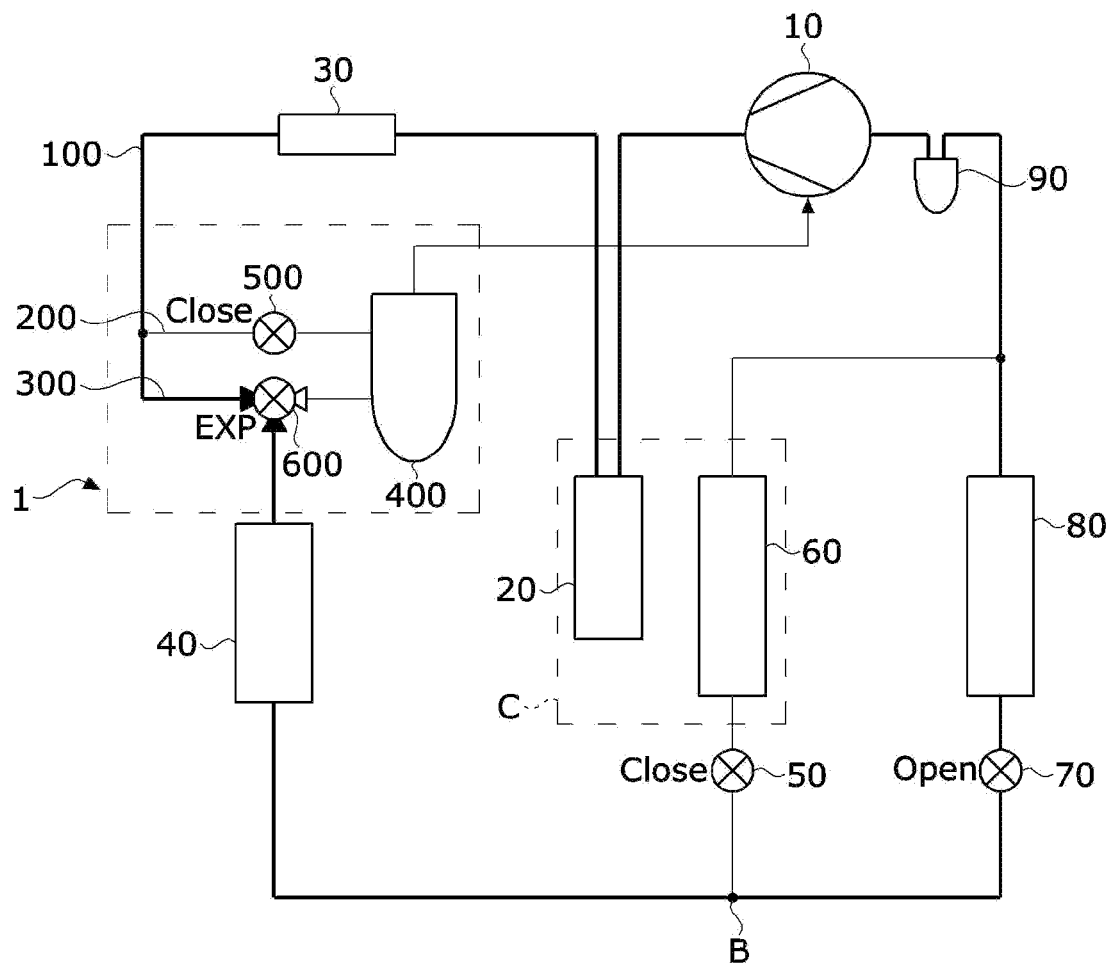
FIG. 13 is a view illustrating an operating state of the system in a general heating mode in FIG. 10.

FIG. 10 is a structural view of a heat pump system using a vapor injection module according to another embodiment of the present invention, FIG. 11 is a view illustrating an operating state of the system in a cooling mode in FIG. 10, FIG. 12 is a view illustrating an operating state of the system in a vapor injection heating mode in FIG. 10, and FIG. 13 is a view illustrating an operating state of the system in a general heating mode in FIG. 10. Like reference numerals indicated in FIGS. 1 to 9 refers to like members in the description with reference to FIGS. 10 to 13, and the detailed description of the identical members will be omitted.

Referring to FIG. 10, the heat pump system using the vapor injection module 1 according to another embodiment of the present invention may include the compressor 10, a condenser 30, an internal heat exchanger 20, the first expansion means 500, the second expansion means 600, the gas-liquid separator 400, an external heat exchanger 40, a third expansion means 50, an evaporator 60, a fourth expansion means 70, a chiller 80, and an accumulator 90.

The compressor 10 operates by receiving power from an engine (internal combustion engine) or a motor. The compressor sucks the refrigerant, compresses the refrigerant into a high-temperature, high-pressure gaseous refrigerant, and then discharges the refrigerant to the condenser 30.

The internal heat exchanger 20 may heat the interior by allowing the refrigerant introduced from the compressor 10 to exchange heat with air conditioning air. The internal heat exchanger 20, together with the evaporator 60 to be described below, may be disposed in an air conditioning casing C of the vehicle and heat the interior of the vehicle.

In one embodiment, the internal heat exchanger 20 may use the condenser as a heat exchanger for heating the interior.

The refrigerant flowing through the internal heat exchanger 20 may exchange heat with the air, and the air, which has exchanged heat with the refrigerant, may be introduced into the interior and heat the interior.

In addition, the refrigerant in the internal heat exchanger 20 may exchange heat with a coolant, and the coolant, which has exchanged heat with the refrigerant, may exchange heat with the air for heating the interior.

As described above, an air-cooled heat exchanger or a water-cooled heat exchanger may be used as the internal heat exchanger 20.

In one embodiment, the internal heat exchanger 20 may further include a water-cooled condenser configured to allow the discharged refrigerant and the coolant to exchange heat with each other. The water-cooled condenser included in the internal heat exchanger 20 may exchange heat with the coolant flowing through the coolant line, and the coolant, which has exchanged heat with the water-cooled condenser, may heat the interior.

The condenser 30 serves as a condenser in both the cooling mode and the heating mode. The condenser 30 may condense the compressed refrigerant. The refrigerant condensed by the condenser 30 flows along the first line 100 and is supplied to the vapor injection module 1. In one embodiment, a water-cooled condenser 30 may be used as the condenser 30.

The first expansion means 500 may block a flow of the condensed refrigerant or expand the condensed refrigerant and transmit the expanded refrigerant to the gas-liquid separator 400 in accordance with the air conditioning mode. The first expansion means 500 is disposed in the second line 200 that connects the first line 100 and the gas-liquid separator 400. The first ball valve 510 disposed in the first expansion means 500 may determine whether to move and expand the refrigerant.

The second expansion means 600 may be connected to the gas-liquid separator 400 in parallel with the first expansion means 500, allow the refrigerant to pass therethrough or expand the refrigerant in accordance with the air conditioning mode, and discharge the refrigerant to the external heat exchanger 40. The second expansion means 600 may be disposed in the third line 300 that connects the first line 100 and the gas-liquid separator 400. The second ball valve 610 disposed in the second expansion means 600 may determine the movement direction of the refrigerant and whether to expand the refrigerant. The second line 200 and the third line 300 are connected to each other in parallel. The third line 300 may be disposed below the second line 200 so that the liquid refrigerant separated in the gas-liquid separator 400 flows.

A 3/2-way expansion valve may be used as the second expansion means 600. The 3/2-way expansion valve may determine the flow direction of the introduced refrigerant, determine whether to expand the refrigerant, and control the flow rate.

The gas-liquid separator 400 may separate the refrigerant having passed through the first expansion means 500 into the gaseous refrigerant and the liquid refrigerant and move the liquid refrigerant of the separated refrigerant to the second expansion means, and the gaseous refrigerant may be introduced into the compressor 10 again.

The gas-liquid separator 400 may serve to separate the refrigerant into the gaseous refrigerant and the liquid refrigerant together with the accumulator 90 disposed before the refrigerant circulates through the refrigerant line and enters the compressor 10. However, there is a difference in that the accumulator 90 supplies the gaseous refrigerant to the compressor 10, whereas the gas-liquid separator 400 allows the separated liquid refrigerant to flow as it is.

The liquid refrigerant separated by the gas-liquid separator 400 passes through the second expansion means 600 disposed in the third line 300. In this case, the second expansion means 600 may additionally decompress the liquid refrigerant separated by the gas-liquid separator 400.

The external heat exchanger 40 is an air-cooled heat exchanger and is installed at a front side of an engine room of the vehicle. The external heat exchanger 40, together with a radiator, is disposed in a straight line in a flow direction of air blown by a blower fan. In addition, the external heat exchanger 40 may exchange heat with the low-temperature coolant discharged from the radiator.

In addition, the external heat exchanger 40 may perform different functions in accordance with the air conditioning mode. In the cooling mode, the external heat exchanger 40 serves as the condenser 30 identical to the water-cooled condenser 30. In the heating mode, the external heat exchanger 40 serves as the evaporator 60 that performs a different function from the water-cooled condenser 30.

The third expansion means 50 may be disposed at a side adjacent to an inlet of the evaporator 60 and perform functions of expanding the refrigerant, controlling the flow rate, and controlling the opening and closing operations.

The evaporator 60 is installed in the air conditioning casing C and disposed in the refrigerant circulation line. During a process in which the low-temperature, low-pressure refrigerant discharged from the third expansion means 50 is supplied to the evaporator 60 and air flowing in the air conditioning casing C by the blower passes through the evaporator 60, the air exchanges heat with the low-temperature, low-pressure refrigerant in the evaporator 60 and is converted into cold air. Then, the cold air is discharged into the vehicle interior and cools an occupant compartment. That is, the evaporator 60 serves as the evaporator 60 in a refrigerant circulation line.

The fourth expansion means 70 may be connected to the third expansion means 50 in parallel and perform functions of expanding the circulating refrigerant, controlling the flow rate, and controlling the opening and closing operations.

The low-temperature, low-pressure refrigerant discharged from the fourth expansion means 70 may be supplied to the chiller 80 and exchange heat with the coolant flowing in a coolant circulation line. Meanwhile, the cold coolant made by heat exchange in the chiller 80 may circulate through the coolant circulation line and exchange heat with a high-temperature battery.

The accumulator 90 is installed in the refrigerant circulation line at a side adjacent to an inlet of the compressor 10. The refrigerant having passed through the evaporator 60 and/or the chiller 80 is merged into the accumulator 90. The accumulator 90 may separate the refrigerant into the liquid refrigerant and the gaseous refrigerant, supply only the gaseous refrigerant to the compressor 10, and store the surplus refrigerant.

A suction port of the compressor 10 may be connected to a gaseous refrigerant outlet of the accumulator 90. Therefore, it is possible to prevent the liquid refrigerant from being sucked into the compressor 10.

In the embodiment of the present invention, the first expansion means 500, the second expansion means 600, the third expansion means 50, and the fourth expansion means 70 may perform expansion, communication, and blocking functions according to the respective modes. In other words, the respective expansion means may three functions of expanding the refrigerant, allowing the refrigerant to pass without being expanded, and blocking the refrigerant.

FIG. 11 is a view illustrating an operating state of the system in a cooling mode in FIG. 10.

Referring to FIG. 11, in the cooling mode, the compressor 10 operates, and the high-temperature, high-pressure refrigerant is discharged from the compressor 10. The compressed refrigerant flows to the internal heat exchanger 20 and is introduced into the water-cooled condenser 30 by bypassing the internal heat exchanger 20 that does not operate.

The refrigerant introduced into the water-cooled condenser 30 is cooled by exchanging heat with the coolant, and the cooled refrigerant is introduced into the vapor injection module 1 along the first line 100.

The first expansion means 500 prevents the refrigerant flowing along the first line 100 from flowing into the second line 200, and the refrigerant is introduced into the third line 300. The second expansion means 600 disposed in the third line 300 performs the bypass operation on the refrigerant, such that the refrigerant introduced into the external heat exchanger 40. The refrigerant is cooled by exchanging heat with outside air in the external heat exchanger 40. That is, both the water-cooled condenser 30 and the external heat exchanger 40 serve as the condenser 30 and condense the refrigerant.

Thereafter, the condensed refrigerant is throttled and expanded while passing through the third expansion means 50. Thereafter, the expanded refrigerant passes through the evaporator 60 while exchanging heat with the air blown by the air blower (not illustrated) of the air conditioning casing C, such that the refrigerant is evaporated, and the air is cooled. The cooled air is supplied to the vehicle interior and used to cool the vehicle interior. Further, the refrigerant evaporated by the evaporator 60 flows into the compressor 10 again via the accumulator 90.

The remaining part of the refrigerant branching off from the refrigerant branch part B passes through the fourth expansion means 70.

In this case, the fourth expansion means 70 is closed so that the refrigerant may be introduced into the evaporator 60, and the refrigerant may expand and enter the chiller 80.

After the refrigerant is throttled and expanded by the fourth expansion means 70, the expanded refrigerant may exchange heat with the coolant while passing through the chiller 80, such that the refrigerant may be evaporated, and the coolant may be cooled. Further, the refrigerant evaporated in the chiller 80 flows into the compressor 10 again via the accumulator 90. As described above, the refrigerant having passed through the evaporator 60 and the refrigerant having passed through the chiller 80 merge with each other in the accumulator 90 and flow into the compressor 10. The refrigerant circulates as the above-mentioned process is repeated.

FIG. 12 is a view illustrating an operating state of the system in a vapor injection heating mode in FIG. 10.

Referring to FIG. 12, in the vapor injection heating mode, the compressor 10 operates, and the high-temperature, high-pressure refrigerant is discharged from the compressor 10. The compressed refrigerant flows to the internal heat exchanger 20 and is introduced into the water-cooled condenser 30 by bypassing the internal heat exchanger 20 that does not operate.

The refrigerant introduced into the water-cooled condenser 30 is cooled by exchanging heat with the coolant, and the cooled refrigerant is introduced into the vapor injection module 1 along the first line 100.

The refrigerant flowing along the first line 100 flows to the second line 200. The refrigerant is expanded to a middle pressure by the first expansion means 500 and flows toward the gas-liquid separator 400.

The expanded refrigerant flows toward the gas-liquid separator 400. The liquid refrigerant separated in the gas-liquid separator 400 flows to the second expansion means 600. The liquid refrigerant is additionally decompressed to a low pressure and then introduced into the external heat exchanger 40.

In the vapor injection heating mode, an expansion pressure of the refrigerant may be adjusted as the refrigerant sequentially passes through the first expansion means 500 and the second expansion means 600, which makes it possible to improve the efficiency.

The second expansion means 600 may block the third line 300 connected to the first line 100 so that the refrigerant is introduced into the second line 200. The second ball valve 610 disposed in the second expansion means 600 may expand the refrigerant separated in the gas-liquid separator 400 and supply the expanded refrigerant to the external heat exchanger 40.

In this case, during the heating operation, in some instances, the second expansion means 600 may change a flow rate of the refrigerant having passed through the gas-liquid separator 400 to maintain optimal COP. That is, the second expansion means 600 may adjust an opening degree by rotating the ball valve, thereby adjusting the flow rate of the refrigerant having passed through the gas-liquid separator 400. On the contrary, to improve the system performance while abandoning the optimal COP, it is possible to forcibly reduce the flow rate of the refrigerant. That is, according to the present invention, the second expansion means 600 may change the amount of expansion of the refrigerant in the vapor injection heating mode. Therefore, it is possible to ensure the optimal COP or the optimal system performance.

The gaseous refrigerant separated in the gas-liquid separator 400 may flow into the compressor 10 again. Therefore, because the refrigerant with a higher temperature than the refrigerant introduced from the accumulator 90 may flow into the compressor 10 again, thereby improving the heating efficiency.

The refrigerant having passed through the external heat exchanger 40 absorbs heat of outside air while being evaporated by exchanging heat with the outside air. Thereafter, the refrigerant passes through the refrigerant branch part B and the fully opened fourth expansion means 70 and flows into the chiller 80. In the chiller 80, the refrigerant may be heated by exchanging heat with the coolant. Next, the refrigerant having passed through the chiller 80 flows into the compressor 10 again via the accumulator 90. In this case, the third expansion means 50 is closed, such that the refrigerant may not flow to the evaporator 60. Therefore, the refrigerant circulates as the above-mentioned process is repeated.

FIG. 13 is a view illustrating an operating state of the system in a general heating mode in FIG. 10.

Referring to FIG. 13, in the general heating mode (non-vapor injection mode), the compressor 10 operates, and the high-temperature, high-pressure refrigerant is discharged from the compressor 10. The compressed refrigerant flows to the internal heat exchanger 20 and is introduced into the water-cooled condenser 30 by bypassing the internal heat exchanger 20 that does not operate.

The refrigerant introduced into the water-cooled condenser 30 is cooled by exchanging heat with the coolant, and the cooled refrigerant is introduced into the vapor injection module 1 along the first line 100.

The first expansion means 500 prevents the refrigerant flowing along the first line 100 from flowing into the second line 200, and the refrigerant is introduced into the third line 300. The second expansion means 600 disposed in the third line 300 expands the refrigerant to a low pressure and introduces the refrigerant into the external heat exchanger 40, and the refrigerant is cooled by exchanging heat with outside air in the external heat exchanger 40. That is, both the water-cooled condenser 30 and the external heat exchanger 40 serve as the condenser 30 and condense the refrigerant.

The second expansion means 600 may block the third line 300 connected to the gas-liquid separator 400 so that the refrigerant is introduced into the second line 200. The second ball valve 610 disposed in the second expansion means 600 may expand the refrigerant introduced through the third line 300 and supply the expanded refrigerant to the external heat exchanger 40.

The refrigerant having passed through the external heat exchanger 40 absorbs heat of outside air while being evaporated by exchanging heat with the outside air. Thereafter, the refrigerant passes through the refrigerant branch part B and the fully opened fourth expansion means 70 and flows into the chiller 80. In the chiller 80, the refrigerant may be heated by exchanging heat with the coolant. Next, the refrigerant having passed through the chiller 80 flows into the compressor 10 again via the accumulator 90. In this case, the third expansion means 50 is closed, such that the refrigerant may not flow to the evaporator 60. Therefore, the refrigerant circulates as the above-mentioned process is repeated.

The embodiment of the present invention has been specifically described above with reference to the accompanying drawings.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

DESCRIPTION OF REFERENCE NUMERALS

1: Vapor injection module
10: Compressor
20: Internal heat exchanger
30: Condenser
40: External heat exchanger
50: Third expansion means
60: Evaporator
70: Fourth expansion means
80: Chiller
90: Accumulator
100: First line
110: Inlet port
200: Second line
300: Third line
400: Gas-liquid separator
410: Housing
420: Outflow passage
430: Movement passage
440: Partition wall part
500: First expansion means
510: First ball valve
511: First inflow hole
513: First expansion groove
600: Second expansion means
601: Refrigerant outlet
610: Second ball valve
611: Second inflow hole
613: Second outflow hole
613a: Second expansion groove
C: Air conditioning casing
B: Refrigerant branch part

The invention claimed is:
1. A vapor injection module comprising:
a first expansion means configured to block a flow of a condensed refrigerant or expand the condensed refrigerant and transmit the refrigerant to a gas-liquid separator in accordance with an air conditioning mode;
the gas-liquid separator configured to receive the refrigerant from the first expansion means and separate the refrigerant into gaseous refrigerant and liquid refrigerant; and
a second expansion means configured to allow the condensed refrigerant to pass therethrough, expand the condensed refrigerant, or expand the liquid refrigerant separated in the gas-liquid separator in accordance with the air conditioning mode,
wherein the first expansion means is coupled to be positioned on an upper side of one side of the gas-liquid separator, and the second expansion means is coupled to be positioned on a lower side of one side of the gas-liquid separator,
wherein the vapor injection module further comprises:

a first line connected to an inlet port into which the refrigerant is introduced;

a second line connected to the first line and one region of the upper side of the gas-liquid separator;

a third line connected to the first line and one region of the lower side of the gas-liquid separator;

wherein the first expansion means is disposed in the second line;

wherein the second expansion means disposed in the third line;

wherein the first expansion means, the gas-liquid separator, and the second expansion means are integrally assembled to form a single assembly that enables control of the refrigerant movement depending on the air conditioning mode, wherein the air conditioning mode comprises a cooling mode, a vapor injection mode, or a heating mode;

wherein in the cooling mode, the refrigerant flows along the first line and the third line, a flow of the refrigerant in the second line is blocked by the first expansion means, and the second expansion means performs a bypass operation on the refrigerant;

wherein in the vapor injection heating mode, the refrigerant flows along the first line, the refrigerant is expanded by the first expansion means and flows to the gas-liquid separator, and the liquid refrigerant separated in the gas-liquid separator is expanded by the second expansion means and discharged; and wherein in the heating mode, the refrigerant flows along the first line and the second line, and the refrigerant is expanded by the second expansion means and discharged.

2. The vapor injection module of claim 1, wherein when the first expansion means blocks the flow of the condensed refrigerant, the second expansion means allows the condensed refrigerant to pass therethrough or expands the condensed refrigerant.

3. The vapor injection module of claim 1, wherein in the vapor injection heating mode, the first expansion means expands the condensed refrigerant, the gas-liquid separator separates the expanded refrigerant into gaseous refrigerant and the liquid refrigerant, transmits gaseous refrigerant to a compressor, and transmits the liquid refrigerant to the second expansion means, and the second expansion means expands the liquid refrigerant.

4. The vapor injection module of claim 1, wherein the gas-liquid separator separates the refrigerant into the gaseous refrigerant and the liquid refrigerant only in the vapor injection heating mode.

5. The vapor injection module of claim 1, wherein the first expansion means comprises a ball valve disposed in the second line and configured to rotate.

6. The vapor injection module of claim 5, wherein the ball valve comprises an inflow hole, and an expansion groove connected to the inflow hole.

7. The vapor injection module of claim 1, wherein the gas-liquid separator comprises:

a housing having an internal space in which the refrigerant flows;

an outflow passage disposed at an upper side of the housing and configured to discharge the gaseous refrigerant, the outflow passage being provided in the form of a pipe to prevent the introduction of the liquid refrigerant; and a movement passage disposed at a lower side of the housing and configured to discharge the liquid refrigerant to the second expansion means.

8. The vapor injection module of claim 7, wherein the second line is connected to the housing and is disposed so that the refrigerant is discharged toward a sidewall of the housing.

9. The vapor injection module of claim 8, wherein a partition wall part is disposed at one side of the movement passage and configured to prevent the refrigerant from scattering.

10. The vapor injection module of claim 9, wherein the partition wall part is larger than a diameter of the outflow passage.

11. The vapor injection module of claim 1, wherein the second expansion means comprises a ball valve having an inflow hole, an outflow hole connected to the inflow hole, and an expansion groove formed at one side of the outflow hole.

* * * * *